United States Patent
Christ et al.

(10) Patent No.: US 11,473,547 B2
(45) Date of Patent: Oct. 18, 2022

(54) METHOD AND CONTROL UNIT FOR CARRYING OUT AN ENGINE STOP OF AN INTERNAL COMBUSTION ENGINE

(71) Applicant: Bayerische Motoren Werke Aktiengesellschaft, Munich (DE)

(72) Inventors: Thomas Christ, Munich (DE); Dominik Schwarzbach, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 83 days.

(21) Appl. No.: 16/838,632

(22) Filed: Apr. 2, 2020

(65) Prior Publication Data
US 2020/0232436 A1  Jul. 23, 2020

Related U.S. Application Data

(63) Continuation of application No. PCT/DE2018/200899, filed on Nov. 6, 2018.

(30) Foreign Application Priority Data

Nov. 28, 2017 (DE) ...................... 10 2017 221 320.5

(51) Int. Cl.
  *F02N 19/00* (2010.01)
  *B60W 20/17* (2016.01)
  (Continued)

(52) U.S. Cl.
  CPC ........... *F02N 19/005* (2013.01); *B60W 10/02* (2013.01); *B60W 10/06* (2013.01); *B60W 10/08* (2013.01);
  (Continued)

(58) Field of Classification Search
  CPC .. B60K 2006/4825; B60K 6/387; B60K 6/48; B60W 10/02; B60W 10/06; B60W 10/08;
  (Continued)

(56) References Cited

U.S. PATENT DOCUMENTS 9,481,356 B2 * 11/2016 Nakanishi ............. F02N 19/005
10,145,327 B2 * 12/2018 Okazaki ............. F02D 41/3809
(Continued)

FOREIGN PATENT DOCUMENTS

| CN | 1736782 A | 2/2006 |
| CN | 101959732 A | 1/2011 |

(Continued)

OTHER PUBLICATIONS

Heywood, Jan. 1988, Internal Combustion Engine Fundamentals, 1988, pp. 1-19. (Year: 1988).*
(Continued)

*Primary Examiner* — Carl C Staubach
(74) *Attorney, Agent, or Firm* — Crowell & Moring LLP

(57) ABSTRACT

A control unit is provided for a vehicle having an internal combustion engine with a shaft, which can be coupled to an electric machine or decoupled from the electric machine. The control unit is designed to couple the electric machine to the internal combustion engine during an engine stop of the internal combustion engine. The control unit causes the electric machine to guide the shaft of the internal combustion engine. The control unit determines that a speed of the guided shaft is equal to or less than a speed threshold value and, in response thereto, decouples the electric machine from the internal combustion engine, such that the internal combustion engine stops without being guided by the electric machine.

19 Claims, 2 Drawing Sheets

(51) Int. Cl.
*B60W 10/02* (2006.01)
*B60W 10/06* (2006.01)
*B60W 10/08* (2006.01)
*F02D 41/04* (2006.01)
*F02N 11/08* (2006.01)
*F02N 11/04* (2006.01)

(52) U.S. Cl.
CPC .......... *B60W 20/17* (2016.01); *F02D 41/042* (2013.01); *F02N 11/0814* (2013.01); *B60W 2510/0638* (2013.01); *B60W 2710/023* (2013.01); *B60W 2710/0644* (2013.01); *B60W 2710/081* (2013.01); *F02N 11/04* (2013.01); *F02N 2019/008* (2013.01)

(58) Field of Classification Search
CPC .......... B60W 2030/206; B60W 20/17; B60W 2510/0638; B60W 2510/0685; B60W 2710/021; B60W 2710/023; B60W 2710/0644; B60W 2710/0661; B60W 2710/081; F02D 41/042; F02N 11/04; F02N 11/0814; F02N 11/0855; F02N 15/022; F02N 19/005; F02N 2019/008; F02N 2200/022; F02N 2200/041; F02N 2200/042; F02N 2300/102; F02N 2300/104; F02N 99/002; Y02T 10/62
See application file for complete search history.

(56) References Cited

U.S. PATENT DOCUMENTS

| | | | | |
|---|---|---|---|---|
| 2004/0149251 | A1* | 8/2004 | Nishikawa | F02D 41/042 123/198 DB |
| 2005/0228575 | A1* | 10/2005 | Murakami | F02D 41/065 701/112 |
| 2005/0255968 | A1 | 11/2005 | Sah et al. | |
| 2006/0048734 | A1* | 3/2006 | Kataoka | F02N 11/04 701/112 |
| 2010/0235067 | A1* | 9/2010 | Nomura | F02D 13/0238 701/103 |
| 2010/0286858 | A1* | 11/2010 | Otokawa | B60W 30/192 701/22 |
| 2012/0116653 | A1 | 5/2012 | Hozumi et al. | |
| 2012/0130619 | A1 | 5/2012 | Hozumi et al. | |
| 2012/0309587 | A1 | 12/2012 | Nozaki | |
| 2015/0032358 | A1* | 1/2015 | Amemiya | B60L 15/2054 701/104 |
| 2015/0051817 | A1* | 2/2015 | Murata | B60W 10/06 701/112 |

FOREIGN PATENT DOCUMENTS

| | | |
|---|---|---|
| CN | 102472179 A | 5/2012 |
| CN | 102483003 A | 5/2012 |
| CN | 102806901 A | 12/2012 |
| CN | 104169149 A | 11/2014 |
| CN | 111824110 A | 10/2020 |
| DE | 197 24 921 A1 | 12/1998 |
| DE | 199 36 885 A1 | 2/2001 |
| DE | 199 36 885 C2 | 1/2002 |
| DE | 10 2004 062 940 A1 | 7/2006 |
| DE | 10 2006 028 334 A1 | 1/2007 |
| DE | 60 2004 012 838 T2 | 5/2009 |
| DE | 10 2010 032 087 A1 | 1/2012 |
| GB | 2 329 427 B | 11/2000 |
| GB | 2427656 B | 1/2010 |
| WO | WO 2009/109822 A1 | 9/2009 |

OTHER PUBLICATIONS

Serway et al, Jan. 1982, Physics for Scientists and Engineers, 1982, pp. 269-270. (Year: 1982).*
Chinese-language Office Action issued in Chinese Application No. 201880076701.X dated May 31, 2021 with English translation (9 pages).
International Search Report (PCT/ISA/210) issued in PCT Application No. PCT/DE2018/100899 dated Feb. 11, 2019 with English translation (five (5) pages).
German-language Written Opinion (PCT/ISA/237) issued in PCT Application No. PCT/DE2018/100899 dated Feb. 11, 2019 (eight (8) pages).
German-language Search Report issued in German Application No. 10 2017 221 320.5 dated Jul. 12, 2018 with partial English translation (10 pages).
Chinese-language Office Action issued in Chinese Application No. 201880076701.X dated Nov. 10, 2021 with English translation (20 pages).

* cited by examiner

METHOD AND CONTROL UNIT FOR CARRYING OUT AN ENGINE STOP OF AN INTERNAL COMBUSTION ENGINE

CROSS REFERENCE TO RELATED APPLICATIONS

This application is a continuation of PCT International Application No. PCT/DE2018/100899, filed Nov. 6, 2018, which claims priority under 35 U.S.C. § 119 from German Patent Application No. 10 2017 221 320.5, filed Nov. 28, 2017, the entire disclosures of which are herein expressly incorporated by reference.

BACKGROUND AND SUMMARY OF THE INVENTION

The invention relates to a method and to a corresponding control unit for carrying out an engine stop of an internal combustion engine.

In order to make possible an engine start of an (for example, direct injection) internal combustion engine without a starter, at least one piston of the internal combustion engine is typically positioned at a defined shutdown position. Here, the shutdown position can be defined in such a way that the shutdown position of the piston makes as high a torque, in particular a maximum torque, as possible in the case of the combustion process of a subsequent engine start, in conjunction with the air which is situated in the corresponding cylinder. A reliable engine start can thus be made possible even without a starter.

Within the context of a stop operation of an internal combustion engine, vibrations of the internal combustion engine can occur which can be perceived as unpleasant by a user of a vehicle.

The present document is concerned with the technical object of making a precise setting of the shutdown position of a shaft or a piston of an internal combustion engine possible in an efficient and comfortable way, in particular in the case of a vehicle with a hybrid drive.

The object is achieved by way of the independent claims. Advantageous embodiments are described, inter alia, in the dependent claims. It is noted that additional features of a patent claim which is dependent on an independent patent claim, without the features of the independent patent claim or only in combination with a part quantity of the features of the independent patent claim, can form an individual invention which is independent of the combination of all the features of the independent patent claim and can be made the subject matter of an independent claim, a divisional application or a subsequent application. This applies in the same way to technical teachings which are described in the description and can form an invention which is independent of the features of the independent patent claims.

In accordance with one aspect, a control unit for a vehicle is described, in particular for a vehicle with a hybrid drive. The vehicle comprises an internal combustion engine with a shaft (in particular, a crankshaft) which can be coupled to an electric machine or can be decoupled from the electric machine. In other words, the shaft of the internal combustion engine can be coupled to an electric machine or decoupled from the electric machine. For example, the drive train of the vehicle can have a separating clutch, via which the shaft of the internal combustion engine can be coupled to the (shaft of the) electric machine or can be decoupled from the (shaft of the) electric machine. Furthermore, the electric machine can be coupled via a transmission to one or more wheels of the vehicle.

The control unit is designed, within the context of an engine stop of the internal combustion engine, to couple the electric machine to the internal combustion engine, with the result that the electric machine guides the shaft of the internal combustion engine until a rotational speed threshold value is reached. In particular, the control unit can be designed to couple the electric machine to the internal combustion engine. For example, the control unit can cause the separating clutch to couple the shaft of the electric machine to the shaft of the internal combustion engine. Furthermore, the control unit can be designed to cause the electric machine to guide the shaft of the internal combustion engine. Here, the shaft of the internal combustion engine can be guided, starting from a starting rotational speed (for example, the idling rotational speed) as far as a (lower) rotational speed threshold value. Here, the rotational speed threshold value lies above zero, for example at 50 rpm, 100 rpm, 200 rpm or more.

At the beginning of the engine stop, the supply (in particular the injection) of fuel into the one or more cylinders of the internal combustion engine can be stopped. Within the context of the engine stop, the internal combustion engine then typically pumps substantially fuel-free air. In particular, air can be sucked in an inlet stroke via an inlet valve into a cylinder of the internal combustion engine. Furthermore, air can be pumped in a compression stroke via an outlet valve out of a cylinder of the internal combustion engine.

Here, at the beginning of the engine stop, the shaft of the internal combustion engine has a starting rotational speed which is higher than the rotational speed threshold value. The starting rotational speed can correspond to the idling rotational speed of the internal combustion engine. A vibration-relevant rotational speed range of the internal combustion engine (which comprises, for example, at least one resonant frequency of the internal combustion engine) can be situated between the starting rotational speed and the rotational speed threshold value. The shaft of the internal combustion engine can therefore be guided, in particular braked, by way of the electric machine in a controlled manner from the starting rotational speed as far as the rotational speed threshold value.

Here, the control unit can be designed to cause the electric machine to guide the shaft of the internal combustion engine in a manner which is dependent on a setpoint rotational speed profile, in a manner which is dependent on a setpoint torque profile and/or in a manner which is dependent on a setpoint shaft position profile. The setpoint rotational speed profile can indicate a temporal setpoint course of the rotational speed of the shaft and/or can be a setpoint course of this type. The setpoint torque profile can indicate a temporal setpoint course of a torque which is brought about on the shaft by the electric machine and/or can be a setpoint course of this type. The setpoint shaft position profile can indicate a temporal setpoint course of a position (in particular of a rotational angle or of an angular position) of the shaft of the internal combustion engine and/or can be a setpoint course of this type.

Thus, the shaft of the internal combustion engine can be guided in a guide phase of the engine stop in a defined way (that is to say, in accordance with a defined setpoint profile) as far as a defined rotational speed threshold value. Vibrations of the internal combustion engine can thus be reduced or avoided in the case of an engine stop. Furthermore, it can be brought about such that the shaft of the internal combustion engine has a defined state when the rotational speed threshold value is reached (that is to say, at the end of the guide phase). Here, in particular, the kinetic energy and/or the position (that is to say, the rotational angle or the angular position) of the shaft of the internal combustion engine at the end of the guide phase can be set in a precise way. A precise shutdown of the shaft of the internal combustion engine in a defined shutdown position (that is to say, with a defined rotational angle or at a defined angular position) can thus be assisted.

Furthermore, the control unit is designed to decouple the electric machine from the internal combustion engine when the rotational speed threshold value is reached, with the result that the shaft of the internal combustion engine comes to a standstill or can come to a standstill without being guided by the electric machine. In particular, the control unit can be designed to determine that the rotational speed of the guided shaft of the internal combustion engine is less than or equal to the rotational speed threshold value. As a reaction thereto (that is to say, when it has been determined that the guided shaft of the internal combustion engine is less than or equal to the rotational speed threshold value), the electric machine can be decoupled from the internal combustion engine, with the result that the shaft of the internal combustion engine is no longer guided by the electric machine. The shaft of the internal combustion engine is then typically braked exclusively by way of the abovementioned pumping operation, and thus comes to a standstill without being guided by the electric machine.

When the rotational speed threshold value is reached, the guide phase can thus be ended and the freewheel phase can be begun, in the case of which the shaft of the internal combustion engine is braked without action of the electric machine (solely by way of the pumping operation of the internal combustion engine) and is brought to a standstill. On account of the preceding guide phase which extends as far as a defined rotational speed threshold value, it can be brought about that the shaft of the internal combustion engine comes to standstill in a defined shutdown position even without guidance by way of the electric machine.

Therefore, the control unit makes a low-vibration shutdown of the shaft of an internal combustion engine at a defined shutdown position possible by way of the combination of a guide phase and a subsequent freewheel phase. Here, a cost-effective electric machine can be used during the guide phase, since the guide phase is ended when a rotational speed threshold value of greater than zero (for example, between 100 rpm and 400 rpm) is reached, and therefore, for example, an electric machine with a stepping motor functionality is not required.

The control unit can be designed to cause the electric machine to set, in particular to regulate, an actual rotational speed of the shaft and/or an actual position of the shaft in a manner which is dependent on the setpoint rotational speed profile and/or the setpoint shaft position profile. The actual rotational speed and/or the actual position can be detected directly or indirectly via one or more sensors of the vehicle.

Therefore, a regulation of the rotational speed and/or the position of the shaft can take place in the guide phase. For this purpose, the control unit can be designed to adapt the torque which is brought about on the shaft by the electric machine in a manner which is dependent on the actual rotational speed and/or the actual position of the shaft (in particular in a manner which is dependent on a difference between the actual rotational speed and the setpoint rotational speed (from the setpoint rotational speed profile) and/or in a manner which is dependent on a difference between the actual position and the setpoint position (from the setpoint position profile)). By way of the regulation of the rotational speed and/or the position of the shaft, vibrations in the case of an engine stop can be reduced further and/or the accuracy of the setting of a defined shutdown position can be increased further.

The setpoint rotational speed profile, the setpoint torque profile and/or the setpoint shaft position profile are preferably dependent on the setpoint shutdown position of the shaft in the case of a standstill of the shaft. In particular, the setpoint rotational speed profile, the setpoint torque profile and/or the setpoint shaft position profile can be defined in such a way that the shaft of the internal combustion engine has a defined state (in particular in relation to kinetic energy and/or position) at the end of the guide phase, which defined state is such that the shaft comes to a standstill at the defined shutdown position in the subsequent freewheel phase. The setpoint rotational speed profile, the setpoint torque profile and/or the setpoint shaft position profile can be determined experimentally within the context of experiments for a defined internal combustion engine.

The setpoint rotational speed profile, the setpoint torque profile and/or the setpoint shaft position profile can be dependent on the temperature of the internal combustion engine, on the air pressure in the surroundings of the internal combustion engine and/or on the operating age of the internal combustion engine. For example, different profiles can be provided (for example as characteristic maps and/or look-up tables) for different temperature values, air pressure values and/or age values. The control unit can then determine the actual temperature value, air pressure value and/or age value for a specific engine stop and, based on this, can select a setpoint rotational speed profile, a setpoint torque profile and/or a setpoint shaft position profile for the guide phase of the engine stop. Vibrations in the case of an engine stop can thus be reduced further and/or the accuracy of the setting of a defined shutdown position can be increased further.

As has already been described above, the internal combustion engine and/or the vehicle can have a vibration-relevant rotational speed range. Here, the rotational speed threshold value is preferably such that the vibration-relevant rotational speed range lies between the starting rotational speed (at the beginning of the engine stop) and the rotational speed threshold value. Here, the shaft which rotates with a rotational speed from the vibration-relevant rotational speed range can bring about a resonance of the internal combustion engine and/or the vehicle (which can be perceived as unpleasant by a user of the vehicle).

The internal combustion engine can be designed in such a way that the shaft of the internal combustion engine would pass through the vibration-relevant rotational speed range in a reference time without action of the electric machine. In other words, a freewheeling shaft might pass through the vibration-relevant rotational speed range in the reference time. Secondly, the setpoint rotational speed profile, the setpoint torque profile and/or the setpoint shaft position profile can be fixed in such a way that the vibration-relevant rotational speed range is passed through in a shorter time than the reference time, in particular in a time which is shorter by the factor 2, 3, 5, 10 or more. The guiding of the shaft of the internal combustion engine can thus bring it about that the vibration-relevant rotational speed range is passed through in an accelerated manner. Vibrations in the case of an engine stop can thus be prevented in a particularly reliable way.

The control unit can be designed to determine position information in relation to an actual position of the shaft of the internal combustion engine (for example, by means of a suitable sensor on the shaft). The electric machine can then be actuated in a manner which is dependent on the position information. In particular, it can be determined on the basis of the position information that the shaft has a predefined setpoint position. As a reaction thereto, the electric machine can then be caused to guide the shaft of the internal combustion engine. The guide phase of the shaft of the internal combustion engine can therefore be begun at a predefined setpoint position of the shaft of the internal combustion engine. It can therefore be brought about with increased accuracy that the shaft has a defined position when the rotational speed threshold value is reached. This in turn has a positive effect on the accuracy of the shutdown position of the shaft.

The control unit can be designed (in particular, in the case of a last intake stroke of the internal combustion engine before standstill) to actuate at least one valve (in particular an inlet valve) of at least one cylinder of the internal combustion engine, in order to set the shutdown position of the internal combustion engine. In particular, a gas spring within the cylinder can be set by way of actuation of the valve. The gas spring can then bring it about that the piston of the cylinder and therefore the shaft of the data carrier are turned back to a defined shutdown position. The accuracy of the setting of the shutdown position of the shaft of the internal combustion engine can thus be increased further.

In accordance with a further aspect, a method for carrying out an engine stop of an internal combustion engine of a vehicle is described. The internal combustion engine comprises a shaft which can be coupled to an electric machine or can be decoupled from the electric machine. The method comprises coupling of the electric machine to the internal combustion engine (e.g. via a separating clutch). Furthermore, the method comprises guiding of the shaft of the internal combustion engine by means of the electric machine. Here, the shaft of the internal combustion engine is typically guided in such a way that the rotational speed of the shaft of the internal combustion engine is reduced constantly and/or continuously. Furthermore, the method comprises determining or detecting that the rotational speed of the guided shaft of the internal combustion engine is less than or equal to a rotational speed threshold value, and/or that the rotational speed of the guided shaft of the internal combustion engine has reached or assumes a rotational speed threshold value. Furthermore, the method comprises, as a reaction to the determining, the decoupling of the electric machine from the internal combustion engine, with the result that the internal combustion engine is no longer guided by the electric machine (and therefore comes to a standstill without guidance by way of the electric machine).

In accordance with a further aspect, a road motor vehicle (in particular a passenger motor car, a truck, a bus or a motorcycle) is described which comprises the control unit which is described in this document.

In accordance with a further aspect, a software (SW) program is described. The SW program can be designed to be run on a processor (for example on a control unit of a vehicle), and, as a result, to carry out the method which is described in this document.

In accordance with a further aspect, a storage medium is described. The storage medium can comprise an SW program which is designed to be run on a processor, and, as a result, to carry out the method which is described in this document.

It is to be noted that the methods, apparatuses and systems which are described in this document can be used both on their own, and also in combination with other methods, apparatuses and systems which are described in this document. Furthermore, any aspects of the methods, apparatuses and systems which are described in this document can be combined with one another in a wide variety of ways. In particular, the features of the claims can be combined with one another in a wide variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As described at the outset, the present document is concerned with the reliable and comfortable setting of the shutdown position of a piston of an internal combustion engine of a vehicle within the context of an engine stop. Here, at the beginning of the engine stop, the fuel supply to the internal combustion engine is typically stopped. Subsequently, the internal combustion engine can run down and/or be braked, until the shaft of the internal combustion engine comes to a standstill at a defined shutdown position. The engine stop of the internal combustion engine is ended when the shutdown position is reached.

Figure 1:
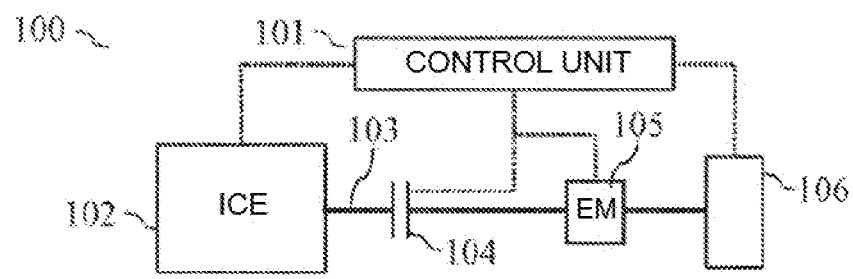
FIG. 1 is a schematic diagram of exemplary components of a vehicle with a hybrid drive.

FIG. 1 shows exemplary components of a (drive train of a) vehicle 100. In particular, FIG. 1 shows the internal combustion engine (ICE) 102 of a vehicle 102, which internal combustion engine is coupled via a drive shaft 103 to a transmission 106, in order to bring about a torque on at least one axle or on at least one wheel of the vehicle 100 (not shown). Furthermore, the vehicle 100 comprises at least one electric machine (EM) 105 which, via a clutch 104, can be coupled to the ICE 102 or can be decoupled from the ICE 102. For example, the vehicle 100 can comprise a P2 hybrid drive with a ICE 102 and an EM 105. The ICE 102, the EM 105, the clutch 104 and/or the transmission 106 can be controlled and/or regulated by way of a control unit 101 of the vehicle 100.

Figure 2:
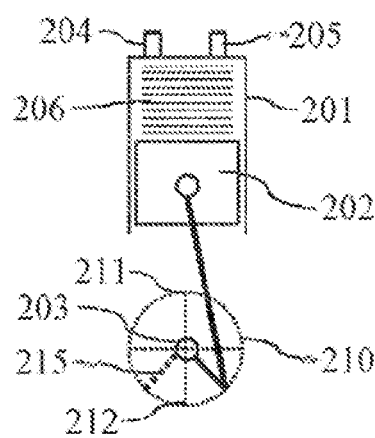
FIG. 2 is a schematic diagram of an exemplary piston of an internal combustion engine.

A ICE 102 typically comprises a plurality of cylinders (for example, 4, 6 or 8 cylinders). FIG. 2 shows a cylinder 201 of ICE 102 by way of example. A piston 202 is arranged movably within the cylinder 201, the crankshaft 203 of the ICE 102 being driven by way of the movement of the piston 202 (which crankshaft 203 in turn drives the drive axle 103 or corresponds to the drive axle 103). The piston 202 moves to and fro through different positions 210 (in particular angles) between a top dead center 211 and a bottom dead center 212. The different positions 210 can be defined as angles between 0° and 360°. Here, the top dead center can lie at 0° or 360°, and the bottom dead center 212 can lie at 180°.

On the path from the top dead center 211 to the bottom dead center 212, air and/or a fuel/air mixture are/is sucked into the cylinder 201 via an inlet valve 204 (intake stroke). Secondly, the air which is situated in the cylinder 201 and/or the fuel/air mixture which is situated in the cylinder 201 are/is compressed when the piston 201 moves from the bottom dead center 212 to the top dead center 211 (compression stroke). Here, air and/or (burned) fuel/air mixture can be conveyed out of the cylinder 201 via the outlet valve 205.

At the beginning of an engine stop, the injection of fuel into the cylinders 201 of the ICE 102 is typically ended, and the ICE 102 can subsequently run down. When the last intake stroke is reached (that is to say, when the last movement of a piston 202 of the ICE 102 from the top dead center 211 to the bottom dead center 212 is reached), before the ICE 102 comes to a standstill, a defined quantity of air can be sucked in in the intake stroke (via the inlet valve 204). Here, the quantity of air which is sucked in is typically dependent on boundary conditions such as the desired shutdown position of the piston 202, the actual rotational speed of the ICE 102 and/or the temperature of the ICE 102. Here, the air quantity can be set by way of the VVT (Variable Valve Timing) lift. In particular, the quantity of air which is sucked into a cylinder 201 of the ICE 102 in the last intake stroke can be set by way of adaptation of the degree of opening and/or the opening time of the inlet valve 204.

The air is compressed in the following compression stroke, and a gas spring 206 is formed in the cylinder 201. The enclosure of a defined quantity of air in the cylinder 201, that is to say setting of the gas spring 206, can bring about a situation where the crankshaft 203 turns back again before reaching the top dead center 211 on account of the expanding gas spring 206. Furthermore, the enclosure of a defined quantity of air in the cylinder 201 can bring about a situation where the crankshaft 203 or the piston 202 comes to a standstill at a defined shutdown position 215. A subsequent engine start can thus be facilitated.

It is disadvantageous that the ICE 102 typically passes through a vibration-relevant rotational speed range below the idling rotational speed in the case of running down of the crankshaft 203, in which vibrations are excited within the ICE 102 and/or within the vehicle 100, which vibrations can be perceived as unpleasant by a user of the vehicle 100.

In particular, in the case of a vehicle 100 with a hybrid drive, one alternative possibility for carrying out an engine stop is the use of the EM 105, in order to guide the crankshaft 203 of the ICE 102 to a standstill. For this purpose, the ICE 102 and the EM 105 can be coupled to one another via the separating clutch 104. For this purpose, a setpoint rotational speed profile (or a setpoint torque profile) can be predefined for the EM 105, according to which profile the ICE 102 is to be braked by the EM 105. Since the ICE 102 and the EM 105 are coupled to one another via the separating clutch 104, the ICE 102 follows the setpoint rotational speed profile which is predefined by way of the EM 105.

The setpoint rotational speed profile can be such that the rotational speed range, in which the one or more vibration resonances of the ICE 102 and/or the vehicle 100 lies/lie, is passed through as rapidly as possible (in particular, more rapidly than in the case of the non-guided running down of the crankshaft 203). The comfort within the context of an engine stop can thus be increased, since an excitation of vibrations can be avoided. Secondly, the use of an EM 105 for braking the crankshaft 203 of the ICE 102 typically does not make it possible to set a precise shutdown position 215 of a piston 202 of the ICE 102. Furthermore, in particular when relatively low rotational speeds of the ICE 102 are reached, the EM 105 must not be coupled to the one or more wheels of the vehicle 100 (for example, via the transmission 106), since otherwise the EM 105 would be driven by way of the one or more wheels of the vehicle 100, and might therefore not guide the crankshaft 203 of the ICE 102 to a standstill.

A precise setting of the shutdown position 215 of the ICE 102 can be achieved, for example, by way of the use of an electric stepping motor, for example an additional stepping motor or a stepping motor for the EM 105. This is associated with additional costs, however.

Figure 3:
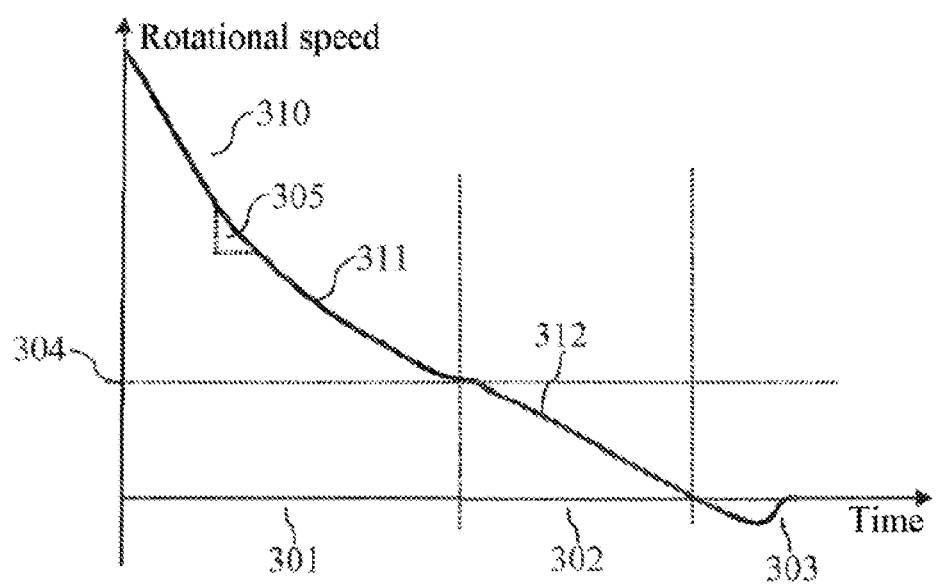
FIG. 3 is a graph of an exemplary time curve of the rotational speed of an internal combustion engine within the context of an engine stop.

FIG. 3 shows an exemplary time curve 310 of the rotational speed of the crankshaft 203 of the ICE 102 within the context of an engine stop. Here, the crankshaft 203 of the ICE 102 is guided in a guide range 301 by way of the EM 105. The course 311 of the rotational speed in the guide range 301 can be predefined by way of the EM 105.

When the rotational speed threshold value 304 is reached, the EM 105 can be decoupled from the ICE 102 by way of the clutch 104. Therefore, a non-guided course 312 of the rotational speed results for rotational speeds below the rotational speed threshold value 304, that is to say in the ranges 302, 303. Here, the non-guided course 312 of the rotational speed in the ranges 302, 303 is dependent on the mechanical resistances within the ICE 102. When the last intake stroke of the ICE 102 is reached, a precise setting of the shutdown position 215 can take place in the range 303 (as described above) by way of a gas spring 206.

The crankshaft 203 can therefore be guided in a first step by way of an EM 105 in accordance with a predefined setpoint rotational speed profile until a rotational speed threshold value 304 is reached (for example, at approximately 300 rpm). A setting of a relatively great time gradient 305 of the setpoint rotational speed profile can achieve a situation where the vibration-relevant rotational speed range of the ICE 102 or of the vehicle 100 is passed through as rapidly as possible. Here, the rotational speed threshold value 304 preferably lies below the vibration-relevant rotational speed range. In a second step, that is to say for rotational speeds below the rotational speed threshold value 304, the ICE 102 can run down in a non-guided manner. Here, a precise setting of the shutdown position 215 can possibly also take place by way of setting of the gas spring 206 of at least one cylinder 201.

In other words, the ICE 102 can be guided by way of the EM 105 as far as a rotational speed threshold value 304. Furthermore, the ICE 102 can be rotated via the gas spring 206 into a desired shutdown position 215. As a result, both high comfort during running down of the ICE 102 and a precise setting of a shutdown position 215 can be achieved. Furthermore, a cost-efficient EM 105 can be used (without a stepping function). Moreover, the EM 105 can be coupled at least temporarily to the wheels of the vehicle 100.

The specification of a defined setpoint rotational speed profile until the rotational speed threshold value 304 is reached can bring about a situation where the ICE 102 has a defined kinetic energy at the beginning of the running down or freewheel phase 302. The ICE 102 therefore has a defined energetic state at the beginning of the running down or freewheel phase 302. In the running down or freewheel phase 302, said defined kinetic energy is dissipated in a defined way, and therefore leads to a defined shutdown position 215 of the ICE 102. Therefore, the shutdown position 215 of the ICE 102 can be influenced by way of setting of the setpoint rotational speed profile. The use of a defined setpoint rotational speed profile in a guide phase 301 of the engine stop therefore makes it possible to increase the accuracy of the setting of a defined shutdown position 215.

In order to further increase the accuracy of the shutdown position 215, the setpoint rotational speed profile can be triggered at a defined angle or at a defined position 210 of the crankshaft 203 in the case of the ICE 102 being guided by way of the EM 105, that is to say in the guide phase 301. This can achieve a situation where the crankshaft 203 comes to a standstill in a defined shutdown position 215 in a reproducible manner.

In order to further increase the accuracy of the shutdown position 215, the setpoint rotational speed profile can be superimposed by way of a regulator in the case of the ICE 102 being guided by way of the EM 105, that is to say in the guide phase 301. For this purpose, the actual rotational speed of the ICE 102 can be detected by means of a rotational speed sensor (not shown). The EM 105 can then be actuated in a manner which is dependent on the difference of the measured actual rotational speed and the predefined setpoint rotational speed (from the setpoint rotational speed profile), in order to regulate the actual rotational speed of the ICE 102 in accordance with the predefined setpoint rotational speed profile.

As an alternative or in addition, a defined crankshaft position 210 can be set (in particular can be adjusted). In the case of a deviation of the crankshaft position from a setpoint position (from a setpoint position profile) at a defined engine rotational speed, a regulator can slow down or accelerate the ICE 102 by way of adaptation of the EM torque, with the result that a predefined rotational speed/crankshaft angle profile is set during the guide phase 301, which profile then leads in the subsequent freewheel phase 302 to a de sired shutdown position 215.

Figure 4:
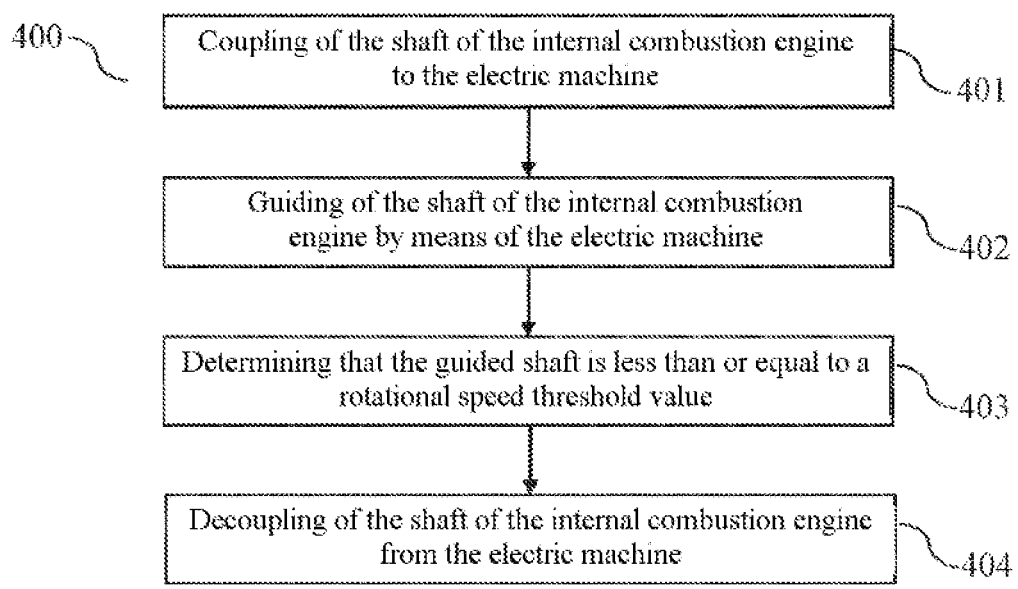
FIG. 4 is a flow chart of an exemplary method for carrying out an engine stop of an internal combustion engine.

FIG. 4 shows a flow chart of an exemplary method 400 for carrying out an engine stop of an internal combustion engine 102 of a vehicle 100. The method 400 can be carried out, for example, by way of a control unit 101 or a control device, for example an engine control unit, of the motor vehicle 100. The internal combustion engine 102 comprises a shaft 103, 203, in particular a crankshaft 203 and/or a drive shaft 103 which is coupled mechanically to the crankshaft 203 and can be coupled to an electric machine 105 or can be decoupled from the electric machine 105 (for example, by means of a clutch 104). In particular, the vehicle 100 can have a drive which is constructed as a P2 hybrid.

The method 400 comprises coupling 401 of the electric machine 105 to the internal combustion engine 102. Furthermore, the method 400 comprises guiding 402 of the shaft 103, 203 of the internal combustion engine 102 by means of the electric machine 105. Here, a setpoint rotational speed profile or a temporal setpoint course of the rotational speed can be predefined by way of the electric machine 105. In other words, after ending of the injection and/or the fuel supply to the internal combustion engine 102, the shaft 103, 203 of the internal combustion engine 102 can be braked by means of the electric machine 105. Here, the electric machine 105 can lead the shaft 103, 203 relatively rapidly through a vibration-relevant rotational speed range of the internal combustion engine 102, with the result that resonances of the internal combustion engine 102 within the context of the engine stop can be avoided. At the beginning of the engine stop (that is to say, in the case of interruption of the fuel supply), the shaft 103, 203 typically has a defined starting rotational speed (for example the idling rotational speed) which can lie, for example, in the range from 800 rpm to 1500 rpm. The rotational speed threshold value lies below the starting rotational speed and above zero (for example between 400 rpm and 100 rpm, for instance at 300 rpm).

Moreover, the method 400 comprises determining 403 that the rotational speed of the guided shaft 103, 303 is less than or equal to a rotational speed threshold value 304. In other words, it can be determined that the rotational speed of the guided shaft 103, 303 of the internal combustion engine 102 has assumed or has possibly already undershot (typically slightly) the rotational speed threshold value 304.

Furthermore, as a reaction to the determining 403, the method 400 comprises decoupling 402 of the electric machine 105 from the internal combustion engine 102 when the rotational speed threshold value 304 is reached, with the result that the internal combustion engine 102 comes to a standstill without being guided by the electric machine 105. In other words, free running down of the shaft 103, 203 of the internal combustion 102 can take place from the rotational speed threshold value. A precise shutdown of the shaft 103, 203 at a defined shutdown position 215 is thus made possible (for example, by way of the use of a gas spring 206 in the case of the last intake stroke of the internal combustion engine 102).

The measures which are described in this document make it possible to bring the shaft 103, 203 of an internal combustion engine 102 to a standstill at a defined shutdown position 215 in a low-vibration and precise way with the aid of an electric machine 105.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for a vehicle having an internal combustion engine with a shaft which is couplable to an electric machine or is decouplable from the electric machine, comprising:
   a control unit operatively configured to:
      couple the electric machine to the internal combustion engine during an engine stop of the internal combustion engine;
      cause the electric machine to guide the shaft of the internal combustion engine while coupled to the internal combustion engine;
      determine that a rotational speed of the guided shaft is less than or equal to a rotational speed threshold value corresponding to a lower bound of a vibration-relevant rotational speed range of the internal combustion engine; and in response,
      decouple the electric machine from the internal combustion engine, such the shaft of the internal combustion engine comes to a standstill without being guided by the electric machine.

2. The apparatus according to claim 1, wherein the control unit is further operatively configured to:
   cause the electric machine to guide the shaft of the internal combustion engine in a manner which is dependent on a setpoint rotational speed profile and/or a setpoint torque profile, wherein
      the setpoint rotational speed profile indicates a temporal setpoint course of the rotational speed of the shaft; and/or
      the setpoint torque profile indicates a temporal setpoint course of a torque which is brought about on the shaft by the electric machine.

3. The apparatus according to claim 2, wherein the control unit is further operatively configured to:
cause the electric machine to set an actual rotational speed of the shaft in a manner which is dependent on the setpoint rotational speed profile.

4. The apparatus according to claim 3, wherein the control unit is further operatively configured to:
adapt a torque which is brought about on the shaft by the electric machine in a manner which is dependent on the actual rotational speed of the shaft.

5. The apparatus according to claim 4, wherein
the setpoint rotational speed profile and/or the setpoint torque profile are dependent on a setpoint shutdown position of the shaft at a standstill of the shaft.

6. The apparatus according to claim 2, wherein
the setpoint rotational speed profile and/or the setpoint torque profile are dependent on a setpoint shutdown position of the shaft at a standstill of the shaft.

7. The apparatus according to claim 2, wherein
the shaft which is rotating at a rotational speed from the vibration-relevant rotational speed range brings about a resonance of the internal combustion engine and/or the vehicle; and
the shaft of the internal combustion engine is guided by the electric machine while coupled to the electric machine through the vibration-relevant rotational speed range in a shorter time than a reference time in which the internal combustion engine would pass through the vibration-relevant rotational speed range without being coupled to and guided by the electric machine.

8. The apparatus according to claim 7, wherein
the shorter time is a time which is shorter by a factor of 2 or more.

9. The apparatus according to claim 1, wherein the control unit is further operatively configured to:
determine based on an actual position of the shaft that the shaft has a predefined setpoint position; and in response;
cause the electric machine to guide the shaft of the internal combustion engine.

10. The apparatus according to claim 1, wherein the control unit is further operatively configured to:
actuate at least one valve of at least one cylinder of the internal combustion engine, in order to set a shutdown position of the internal combustion engine.

11. A method for carrying out an engine stop of an internal combustion engine of a vehicle, the internal combustion engine comprising a shaft which is couplable to an electric machine or is decouplable from the electric machine; the method comprising:
coupling the electric machine to the internal combustion engine;
guiding the shaft of the internal combustion engine while coupled to the electric machine;
determining that a rotational speed of the guided shaft is less than or equal to a rotational speed threshold value corresponding to a lower bound of a vibration-relevant rotational speed range of the internal combustion engine; and in response:
decoupling of the electric machine from the internal combustion engine, such that the internal combustion engine comes to a standstill without being guided by the electric machine.

12. The apparatus according to claim 1, wherein the control unit is further operatively configured to:
cause the electric machine to guide the shaft of the internal combustion engine in a manner which is dependent on a setpoint shaft position profile, wherein
the setpoint shaft position profile indicates a temporal setpoint course of a position of the shaft of the internal combustion engine.

13. The method according to claim 11, further comprising:
guiding the shaft of the internal combustion engine in a manner which is dependent on a setpoint shaft position profile, wherein
the setpoint shaft position profile indicates a temporal setpoint course of a position of the shaft of the internal combustion engine.

14. The apparatus according to claim 13, wherein the control unit is further operatively configured to:
cause the electric machine to set an actual position of the shaft in a manner which is dependent on the setpoint shaft position profile.

15. The apparatus according to claim 14, wherein the control unit is further operatively configured to:
adapt a torque which is brought about on the shaft by the electric machine in a manner which is dependent on the actual position of the shaft.

16. The apparatus according to claim 15, wherein
the setpoint shaft position profile is dependent on a setpoint shutdown position of the shaft at a standstill of the shaft.

17. The apparatus according to claim 13, wherein
the setpoint shaft position profile is dependent on a setpoint shutdown position of the shaft at a standstill of the shaft.

18. The apparatus according to claim 13, wherein
the shaft which is rotating at a rotational speed from the vibration-relevant rotational speed range brings about a resonance of the internal combustion engine and/or the vehicle; and
the shaft of the internal combustion engine is guided by the electric machine while coupled to the electric machine through the vibration-relevant rotational speed range in a shorter time than a reference time in which the internal combustion engine would pass through the vibration-relevant rotational speed range without being coupled to and guided by the electric machine.

19. The apparatus according to claim 1, wherein the control unit is further operatively configured to:
determine a position information item in relation to an actual position of the shaft of the internal combustion engine; and
actuate the electric machine in a manner which is dependent on the position information item.

* * * * *